G. STAUNTON.
VACUUM WORK HOLDER.
APPLICATION FILED SEPT. 19, 1906.
1,130,679.
Patented Mar. 2, 1915.
3 SHEETS—SHEET 2.
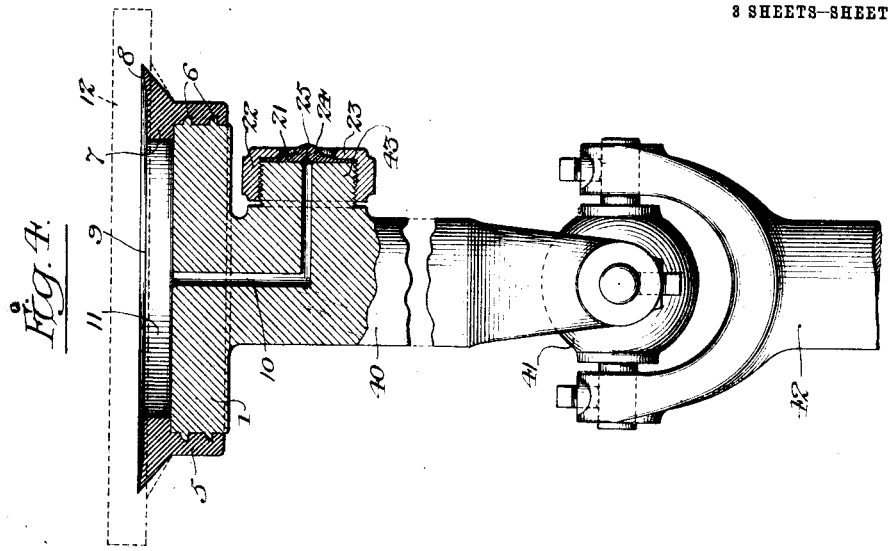
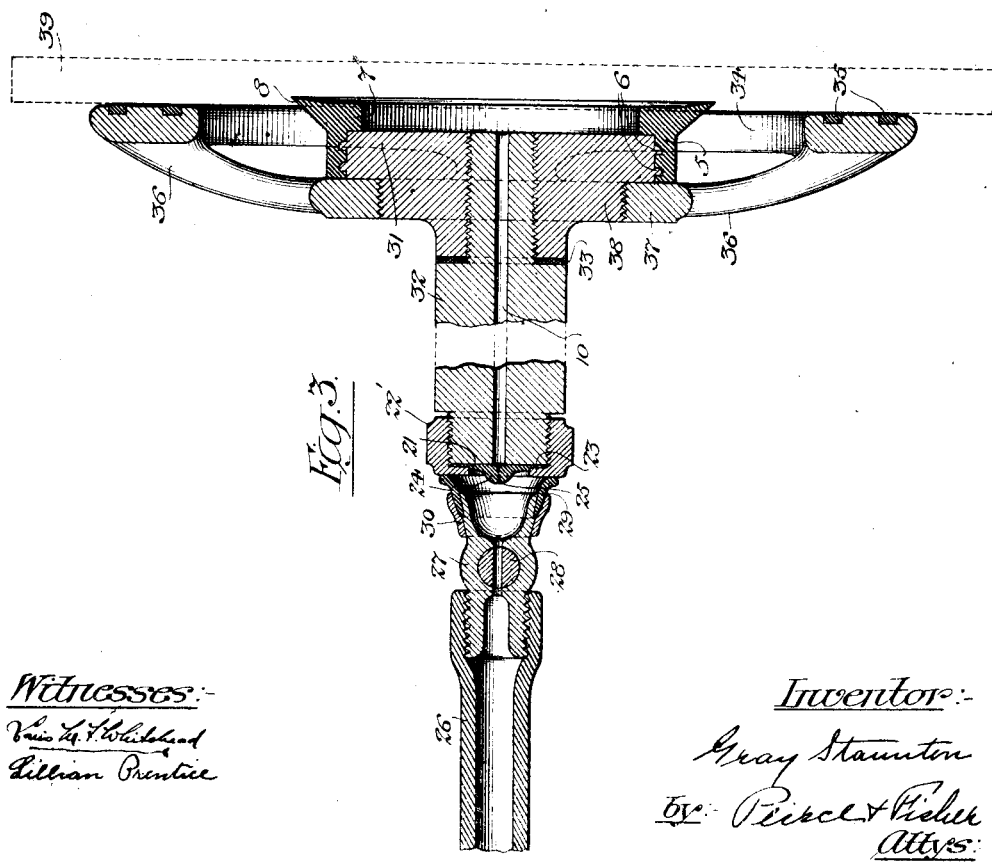
Witnesses:
Inventor:
Gray Staunton
by Pierce & Fisher
Attys.

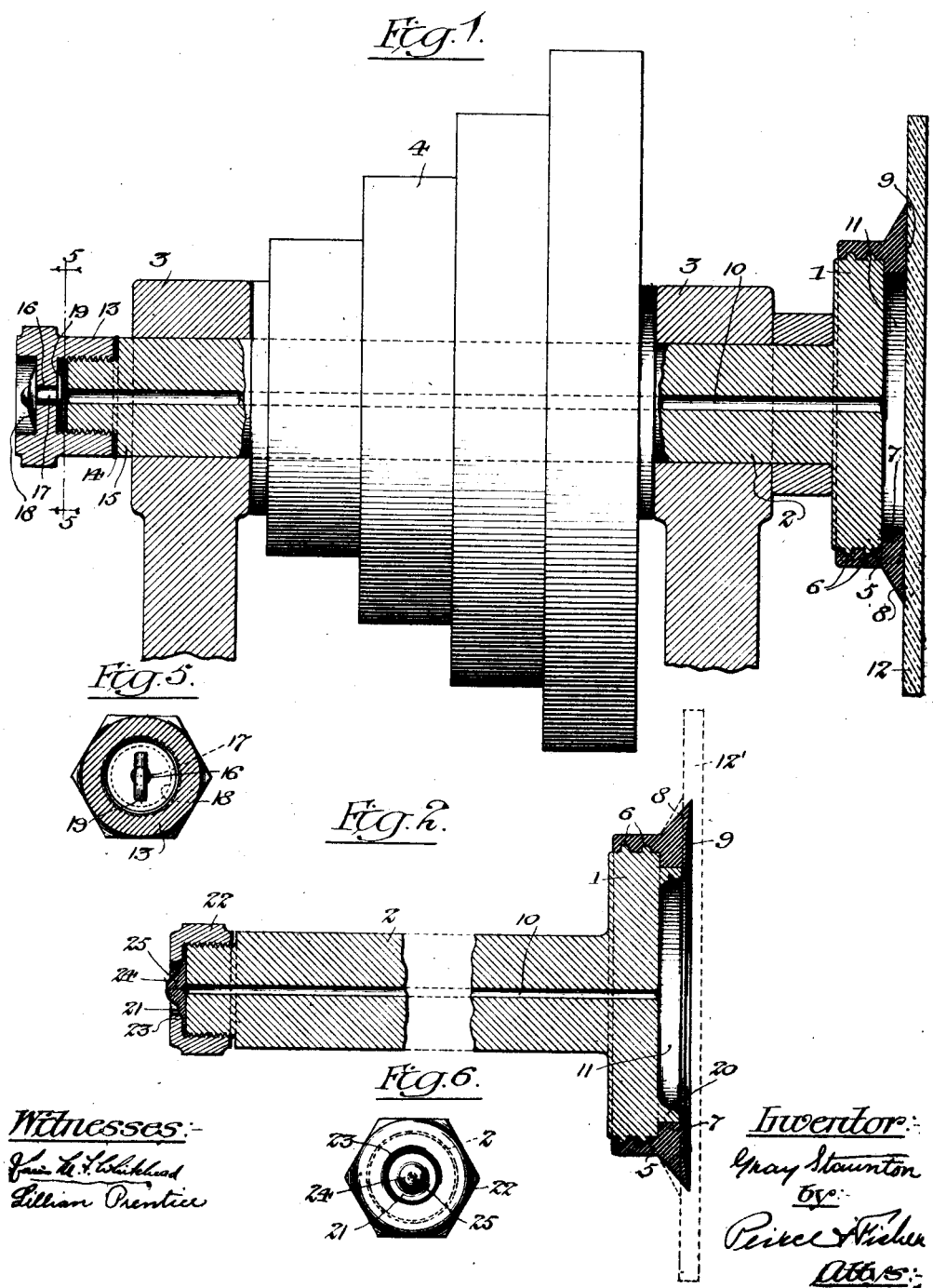

G. STAUNTON.
VACUUM WORK HOLDER.
APPLICATION FILED SEPT. 19, 1906.
1,130,679.
Patented Mar. 2, 1915.
3 SHEETS—SHEET 3.
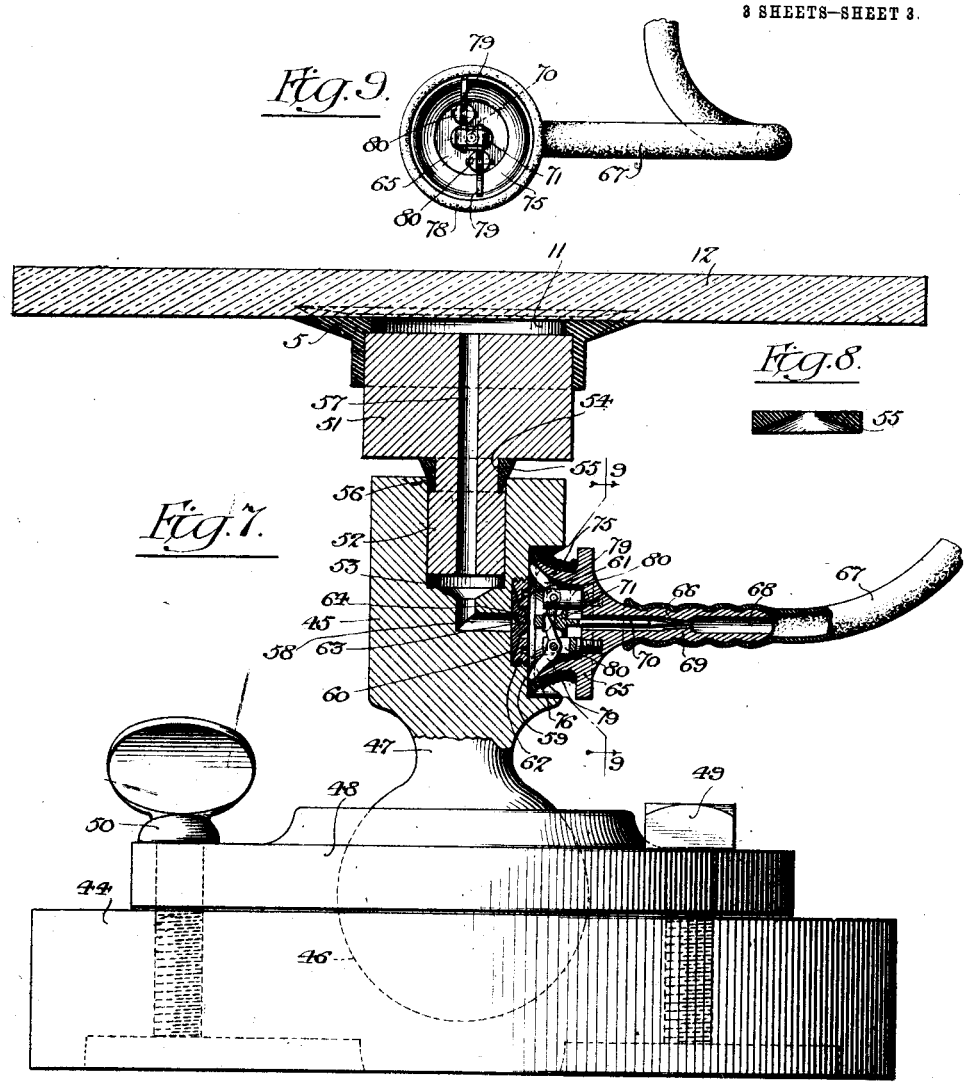
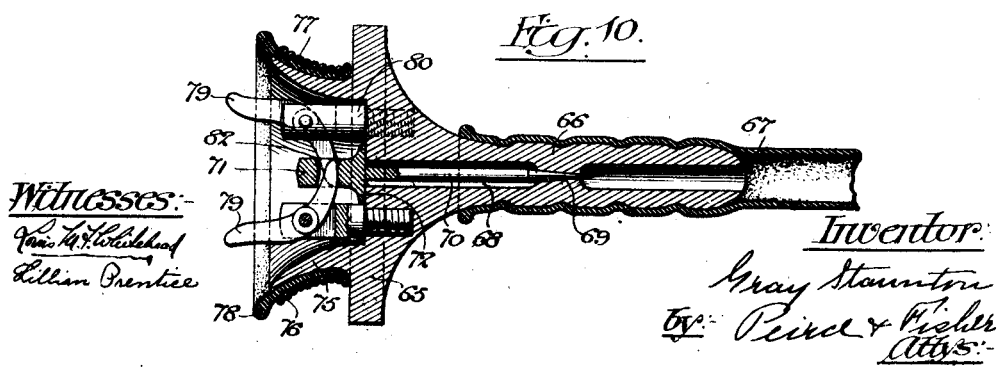

UNITED STATES PATENT OFFICE.

GRAY STAUNTON, OF CHICAGO, ILLINOIS.

VACUUM WORK-HOLDER.

1,130,679.  Specification of Letters Patent.  Patented Mar. 2, 1915.

Application filed September 19, 1906. Serial No. 335,197.

*To all whom it may concern:*

Be it known that I, GRAY STAUNTON, a citizen of the United States, and a resident of Chicago, county of Cook, and State of Illinois, have invented certain new and useful Improvements in Vacuum Work-Holders, of which the following is a specification.

The improvement relates to holding means for the piece or work to be operated upon by tools of different kinds or for the support, which in turn carries the work, and the invention seeks to provide an improved vacuum holder by which the work or work-support may be quickly and easily placed and rigidly held in proper working position and easily released therefrom.

The invention consists in the features of construction, combinations and arrangements of parts hereinafter set forth, illustrated in the accompanying drawings and more particularly pointed out in the appended claims.

The invention is susceptible of many applications when it is desired to hold a piece or body of work securely in position for operation thereon by different kinds of tools. For example, the improved holder may be employed with lathes, planing and shaping machines and other kinds of wood and metal working tools, and it is particularly applicable for supporting small or fragile pieces of work which cannot be readily supported by the means now employed. The invention is also applicable for holding a draftsman's board or engraver's block or the like.

Figure 1 illustrates the application of the improved work holder as a support or chuck for a lathe, parts being shown in section and parts in elevation. Figs. 2 and 3 are sectional views of modifications of the form shown in Fig. 1. Fig. 4 is a view partly in section and partly in elevation of a work holder suitable for supporting a draftsman's board or engraver's block. Figs. 5 and 6 are detail views of the check valves shown in Figs. 1 and 2, parts being shown in section in Fig. 5 on the line 5—5 of Fig. 1. Fig. 7 is a view partially in section and partially in elevation of another form of work holder adapted to support the draftsman's board, engraver's block or the like. Fig. 8 is a view in section of a washer shown in Fig. 7 before it is placed in position. Fig. 9 is an end view of a valve device shown in Fig. 7 taken on the plane indicated by the line 9—9 in Fig. 7 and looking in the direction of the arrows. Fig. 10 is an enlarged sectional view of the valve device shown in Fig. 7.

In Figs. 1 and 2 the rotary lathe head 1 is mounted upon the end of a shank or shaft 2 that is journaled in the bearings 3 of a suitable supporting frame. A stepped pulley 4 is mounted upon the shaft or shank 2 between the bearings 3 and may be belted to any suitable source of power to rotate the shaft and head 1 of the work holder at the desired rate of speed.

A washer 5, against which the work is held is arranged at the outer face of the head 1. This washer is of yielding material and is preferably formed of high grade, soft rubber. The washer is preferably slightly smaller in diameter than the head but is stretched over the periphery of the same so that a tight joint is formed between the head and washer. Preferably also, the head is provided at its periphery with ribs or projections 6 which are pointed or sharpened at their rear edges and which sink into the body of the soft rubber washer to securely hold it in position upon the head. The washer projects as shown, in longitudinal direction beyond the outer face of the head 1 and is preferably provided with an inwardly projecting lip or flange 7 which overlaps the outer face of the head. The washer is also provided with an outwardly projecting, beveled flange or lip 8 which has a sharp edge and which, as shown in Fig. 2, stands normally slightly in front of or beyond the working face 9 of the washer.

The head 1 and shank 2 are provided with a central passage 10 through which air may be drawn from the space 11 between the head and the piece of work 12, when the latter is placed against the washer 5 so that the work will then be securely held in position by atmospheric pressure. When a vacuum is formed in the space 11, the washer 5 will be slightly compressed and the beveled flange or lip 8 will be deflected slightly so that its outer face will then lie in the plane of the outer or working face 9 of the washer, as shown in full lines in Fig. 1 and in dotted lines in Fig. 2. The thin edge of the beveled lip will then be under tension and very snugly pressed into engagement with the piece of work 12 so that a perfectly tight joint will be formed between the washer and the work.

The vacuum is maintained within the space 11 by means of a suitable check valve. The valve shown in Fig. 1 comprises a cap piece or casing 13 which is threaded upon the reduced end of the shank or shaft 2. A yielding washer 14 between the cap or casing 13 and the shoulder 15 prevents leaking at that point. The end of the cap or casing 13 is provided with a central perforation or opening 16 through which extends the shank 17 of a disk valve 18. The valve is held in place by a cross piece 19 on the inner end of the shank. The disk valve, shank 17 and the cross piece 19 are all preferably formed of soft rubber and the valve has a thin edge or lip which normally engages the outer face of the end of the cap or casing 13. The shank 17 is smaller than the opening 16 and the thin edge or lip of the disk valve will yield in outward direction to permit the withdrawal of air through the passage 10 but, when the vacuum is once formed, the thin edge or lip of the disk valve will be pressed snugly into engagement with the face of the cap 13 so that no leakage can occur. The side wall of the cap or casing 13 is preferably extended beyond its end face which forms a seat for the valve so that the latter cannot be accidentally struck to release the vacuum.

In operation the piece of work 12 is placed in proper position against the face of the washer 5 and the air withdrawn from the space 11 and passage 10, by a pump or other suitable means and the piece will then be securely held in working position by atmospheric pressure, as described. In this way, the work may be very easily and quickly placed in position but is readily released therefrom by pinching together the edges of the disk valve 18 to destroy the vacuum within the space 11. The holder is well adapted for small pieces of work and for those of fragile material, such as glass and the like which cannot be readily held by devices usually employed. In Fig. 1 the holder is shown as supporting the glass disk in working position upon the lathe so that its edge may be beveled and the device may be conveniently employed with lathes or other suitable tools for beveling the edges of glass mirrors. In the form shown in Fig. 1, the supporting washer 5 for the glass plate 12 will yield slightly and take up the vibration of the glass when the latter is worked upon by a grinding tool so that the glass will not be easily broken.

When metal is worked upon it is desirable to rigidly hold it in position and in the form shown in Fig. 2, the head 1 is provided on its face and adjacent its edge with a projecting annular abutment or flange 20 against which the inwardly projecting portion 7 of the washer 5 abuts. The working face 9 of the washer 5 normally extends slightly beyond the outer edge or working face of the abutment or flange 20, but when the piece of work 12' is placed in position and the air withdrawn from the space 11, as described, the washer will be compressed and the work will engage the abutment or flange 20 (as indicated in dotted lines in Fig. 2) so that it will be securely held in working position and cannot vibrate or yield laterally.

A modified form of check valve is shown in Fig. 2 which consists of a disk 21 of soft rubber that is held in place against the end of the shank or shaft 2 over the outlet or passage 10. A clamp nut 22 is threaded on the outer reduced end of the shank or shaft 2 and is provided with an inwardly projecting flange or shoulder 23 that engages the edge of the disk 21 to firmly hold it in place and prevent leaking between the edge of the disk and face of the shaft 2. The disk 21 is provided on its outer face with a central protuberance 24 somewhat larger in diameter than the passage 10. This protuberance is provided with a perforation or opening 25; but the walls around the opening form self-closing lips, so that, although air may be readily withdrawn from passage 10 outwardly through the opening 25, exterior pressure will compress the lips or walls about the opening to prevent leaking therethrough.

Any suitable means could be employed for withdrawing the air from the holder to create a vacuum therein. In Fig. 3 a flexible pipe 26 is arranged to be connected to a vacuum tank and is provided on its end with a casing 27 having a plug valve 28. The outer end of the casing is provided with a flaring washer 29 of soft rubber that is held in place thereon by a sleeve or collar 30.

By pressing the washer 29 against the holder over the outlet of the passage 10 and opening valve 28 when the work is in position on the face of the holder, the air will be quickly withdrawn to clamp the work securely in position. A pump having a mouth piece and flange similar to that of the casing 27 could be conveniently employed in some instances.

In the form shown in Fig. 3, the head 31 is removably threaded upon the reduced outer end of the shaft 32 and a packing 33 is employed to prevent leaking between the head and shaft. In this way, heads and washers of different sizes may be provided with the same lathe or other machine for holding pieces of work of different sizes. In this form also, a removable work support is shown in connection with the holder and comprises an annular ring 34 having strips 35 of yielding material set in its face and connected by arms 36 to a central ring 37 that is screw-threaded upon a shoulder 38 on the rear face of the head 31. The arms 36 are inclined forwardly to hold the ring about the washer 5 with its working face slightly behind the working face 9 of the holding washer. When the work 39 is placed in position and clamped as described, the washer will be slightly compressed so that the edges of the work abut against the supporting ring 34 and the work thus held against vibration.

The form of holder shown in Fig. 4 is adapted for use with the draftsman's board or engraver's block. The head 1 and washer 5 are similar to those previously described and are carried upon a shank 40 that is connected by a universal joint 41 of any suitable form to an upright standard 42 or other like support. The outer portion of the passage 10 extends laterally through a boss or offset 43 on the side of the shank 40 and the disk valve 21 is held in place upon the face of the boss 43 by the clamp nut 22. With the structure shown in this modification, a draftsman's board, engraver's block or the like may be clamped in place and moved to any desired position upon the supporting standard 42.

The form shown in Fig. 7 is also adapted for supporting a draftsman's board, engraver's block or like work to be operated on with hand or other tools, and comprises a heavy disk-like support or mount 44 preferably formed of cast metal and a movable shank 45 connected to the support 44 by a universal joint. In the form shown the joint comprises a spherical head 46 connected to the shank by a reduced neck portion 47. The head sets within a semi-cylindrical seat in the upper face of the disk 44 and a corresponding seat in a clamp plate 48 that is secured to the upper face of the supporting disk 44 by a screw bolt 49 and a thumb screw 50. The screw bolts 49 and 50 extend through the clamp plate 48 and support 44 at diametrically opposite points. The clamp plate 48 is spaced by the spherical head 46 a slight distance above the upper face of the support 44, so that, by loosening the thumb screw 50 the shank may be adjusted to any desired position and clamped in such position by tightening the thumb screw. The head 51 is provided on its face with a washer 5 similar to that previously described, and is removably mounted upon the shank 45 so that different sized heads may be employed with the same shank. Instead of being screw-threaded on the shank as in the form shown in Fig. 3, it is provided with a stem and socket connection therewith and is held in place on the shank by the vacuum. In the form shown, the head is provided with a stem 52 which fits snugly within a socket 53 in the outer end of the stem. The upper end of the stem 52 is reduced or provided with an annular recess 54 about which is arranged a washer 55. This washer is triangular in section and, before it is placed in position, has the form indicated in Fig. 8. In placing the washer upon the stem the body portion thereof is given a quarter turn so that its lower thin edge is held under considerable tension about the reduced portion 54 of the stem to firmly grip the same and prevent leaking at that point. When the head is placed in position with its stem 52 within the socket 53, the shoulder 56 above the upper edge of the socket engages the outer beveled or inclined face of the washer. The washer is preferably formed of soft rubber and the socket 53 is of such depth that the stem 52 may be forced or drawn into the socket to press the shoulder 56 snugly against the washer 55 and thus prevent leaking. The head 51 and its stem 52 are provided with a passage 57 leading from the face of the head and the shank 45 is provided with an angular passage 58 leading from the socket 53 and extending outwardly toward the side of the shank. The side of the shank opposite the end of the passage 58 is recessed to present a flat surface 59 and this surface is provided with a central depression or recess 60 of smaller diameter forming a seat for the outwardly opening check valve 61. This check valve is disk-shaped and of soft rubber and is substantially similar to the check valve 25 previously described. It is held in place by a retaining ring 62 threaded into the depression or recess 60 and engaging the edge of the disk-shaped valve. The inner face of the valve is provided with a V-shaped depression 63 and its outer face with a protuberance 64 having a central orifice therethrough. This orifice is normally closed and will be firmly held closed by any excess pressure on the outer face of the valve, but the walls about the orifice will yield outwardly to permit the withdrawal of the air from the space 11 and passages 57 and 58. When the work 12 is placed in position upon the washer 5 and the head is placed in position in the space 52 in the socket 53, the air will be withdrawn from the space 11 between the work 12 and the head 5 by means of a pump or in other suitable manner, so that the atmospheric pressure will firmly hold the work upon the head and will also force the stem 52 of the head into the socket 53 so that a tight joint is formed between the shoulder 56 of the socket and the washer 55. In this way the head is securely held in position upon the shank 55 but can be readily removed therefrom as soon as the vacuum is released.

The valve device shown in Figs. 7, 9 and 10 is preferably employed for forming the vacuum. This device comprises a body portion 65 having a stem 66 on one side to receive the end of a flexible tube 67 that is connected to a suitable vacuum tank. A passage 68 through the body portion 65 and stem 66 is reduced at one point to form a seat 69 for a longitudinally movable needle valve 70. At its outer end the valve is provided with a head 71 and a flange or abutment 72 which, in the closed position of the valve, engages the outer face of the body portion 65. On its outer side the body portion 65 is provided with a projecting flange 75 which is preferably inclined outwardly or flared, as shown. A washer 76 of soft rubber or yielding material is firmly held in place against the outer face of the flange 75 by a wrapping 77 of wire or cord. The thickened edge 78 of the flaring washer 76 projects beyond the edge of the flange 75. A pair of bent shift levers or bell cranks 79 are pivotally mounted between their ends upon the outer forked ends of a pair of studs 80, the reduced inner ends of which are threaded into the body portion 65 within the flange 75. The studs 80 are so arranged, as shown in Fig. 9, that the levers 79 vibrate in parallel planes at equal distances from the axis of the valve 70 and the inner ends of the levers overlap and engage a slot or opening 82 in the head 71 of the valve. The outer ends of the levers project beyond the edges of the flange 75 and washer 76 so that, when the device is placed against the flat face 59 of the shank 45, as shown in Fig. 7, the levers 79 will be turned about their pivots to automatically open the valve 70. At the same time the edge 78 of the washer 76 will be pressed against the flat face 59 to prevent leaking and the air in the space 11 between the work 12 and head 51 and the passages 57 and 58 will be quickly withdrawn to firmly clamp the work and removable head in position.

In each of the forms described the work holder is adapted to securely engage a piece of work through the aid of a vacuum and the holder may thereafter be rotated or otherwise moved as desired for operating on the work with tools of different kinds. The work may be easily and quickly placed in position and released when desired. The form of valve shown in Figs. 2, 3 and 4 may be readily opened to destroy the vacuum and release the work by inserting a pointed instrument into the opening or perforation 25.

It is obvious that numerous changes may be made in the details of construction without departure from the essentials of the invention and that the improved work holder may be employed for a variety of purposes.

Having described my invention, what I claim as new, and desire to secure by Letters Patent, is:—

1. The combination with a suitable support, a head mounted on said support, and a washer of soft rubber mounted on the face of said head, said washer having a flat work engaging face yieldable only by the compression of the body of said washer and a flexible beveled lip at the edge of said working face extending forwardly slightly beyond the same, and said head having a passage therethrough leading from its face, substantially as described.

2. The combination with a suitable support, of a head movably mounted thereon, a washer of soft rubber mounted on the periphery of said head and projecting beyond its face, said washer having an inwardly projecting portion overlapping the face of said head and a beveled lip at its edge extending forwardly slightly beyond the face of the washer, and said head having a passage therethrough leading from its face, substantially as described.

3. The combination with a suitable support, of a head having a shank portion movably mounted in a suitable bearing on said support, a washer of yielding material mounted on the face of said head, said head having a work engaging face yieldable only by the compression of the body of the washer, said head and shank having a passage therethrough leading from the face of said head, and an outwardly-opening check valve mounted in said passage, substantially as described.

4. A vacuum work holder comprising a suitable support, a shank movably mounted on said support, a head having a stem and socket connection with said shank, the stem of said connection fitting within the socket thereof and freely removable therefrom, a packing ring interposed between said stem and shank, a washer mounted on the face of said head against which the work is held, said head and shank having a passage leading therethrough from the face of said head and an outwardly opening check valve for said passage, substantially as described.

5. A vacuum work holder comprising a suitable support, a shank having a universal joint with said support, means for clamping said shank in any desired position upon said support, a removable head on said shank, a washer of yielding material mounted upon the face of said head against which the work is held, said head and shank having a passage leading therethrough from the face of said head and an outwardly opening check valve for said passage, substantially as described.

6. A vacuum work holder comprising a suitable support, a shank movably mounted on said support, a head having a stem fitting within a socket in said shank and freely removable therefrom, a washer of triangular section about the stem of said head and engaging the edge of the socket of said shank, said washer having its thin edge under tension, a washer of flexible material mounted on the face of said head, said head and shank having a passage leading therethrough from the face of the head and an outwardly opening check valve for said passage, substantially as described.

GRAY STAUNTON.

Witnesses:
LILLIA PRENTICE,
KATHARINE GERLACH.